United States Patent [19]

Watanabe

[11] Patent Number: 4,768,116
[45] Date of Patent: Aug. 30, 1988

[54] DEVICE FOR AUTOMATICALLY CHANGING MAGNETIC DISC PACK

[75] Inventor: Yoshiyuki Watanabe, Ashigarakami, Japan

[73] Assignee: Fuji Photo Film Co., Ltd., Kanagwa, Japan

[21] Appl. No.: 852,727

[22] Filed: Apr. 15, 1986

[30] Foreign Application Priority Data

| Apr. 19, 1985 | [JP] | Japan | 60-84337 |
| Apr. 19, 1985 | [JP] | Japan | 60-84338 |
| Apr. 19, 1985 | [JP] | Japan | 60-84339 |
| Apr. 19, 1985 | [JP] | Japan | 60-84340 |
| Apr. 19, 1985 | [JP] | Japan | 60-84998 |
| Apr. 19, 1985 | [JP] | Japan | 60-84999 |
| Apr. 20, 1985 | [JP] | Japan | 60-84757 |

[51] Int. Cl.$^4$ ............... G11B 5/012; G11B 23/02
[52] U.S. Cl. ............................ 360/98; 360/132
[58] Field of Search .................. 360/92, 97-99, 360/132; 369/133, 38, 39

[56] References Cited

U.S. PATENT DOCUMENTS

| 4,635,150 | 1/1987 | Kato et al. | 360/92 X |
| 4,644,515 | 2/1987 | Allebest et al. | 360/98 X |
| 4,646,178 | 2/1987 | Garrati et al. | 360/98 |

Primary Examiner—John H. Wolff
Attorney, Agent, or Firm—Parkhurst & Oliff

[57] ABSTRACT

The device automatically changes a magnetic disc pack and is applicable to a reproducer in an electronic camera system wherein a subject is electronically still-photographed and recorded in a rotating magnetic disc, and the reproducing of an image is carried out by a television system or a printer.

In the device for automatically changing a magnetic disc pack according to the present invention, the magnetic disc packs are installed in a magazine in blocks of a plural number. The magazine as a whole is set in the device for automatic change and each of the magnetic disc packs is drawn out of the magazine in accordance with a reproduction order and set in a reproducing section.

5 Claims, 18 Drawing Sheets

F I G. 1
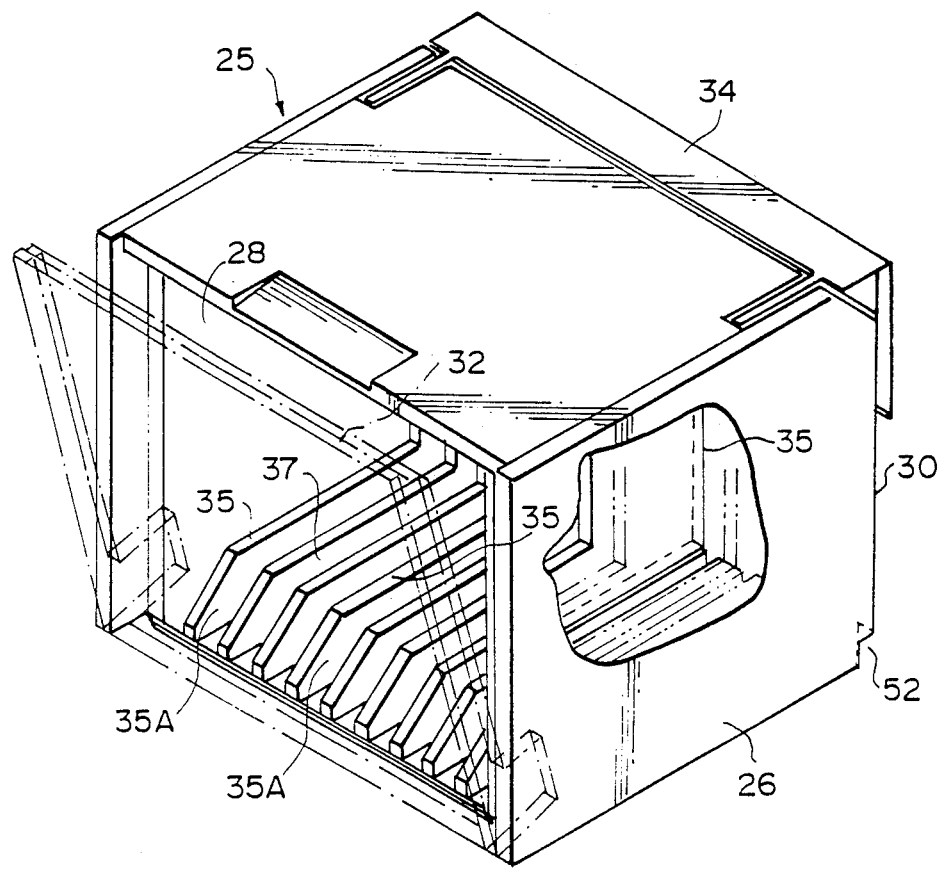

F I G. 3
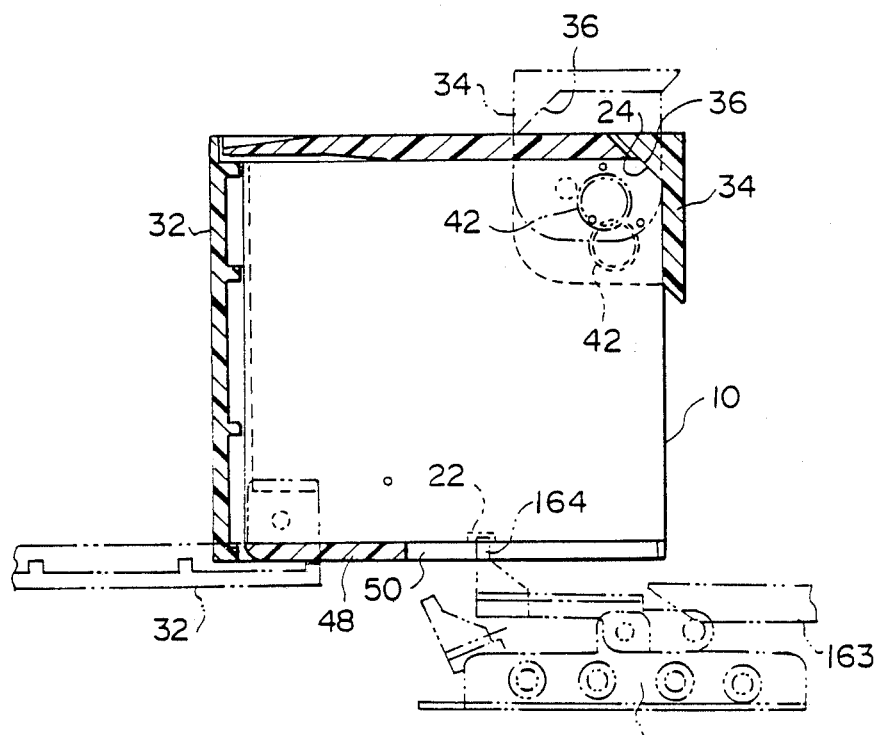
F I G. 4
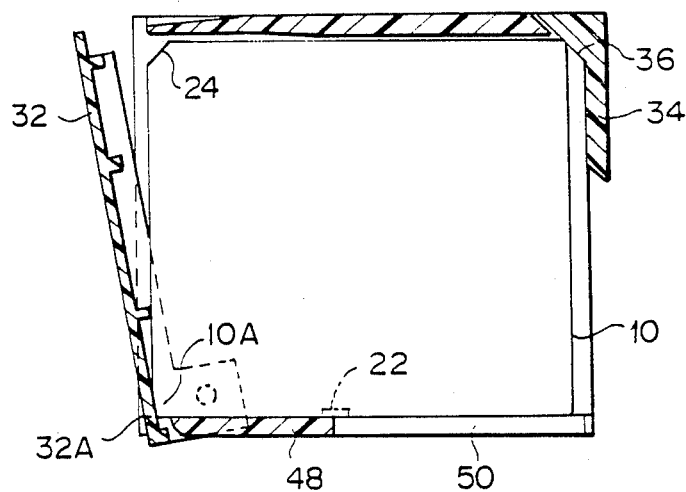

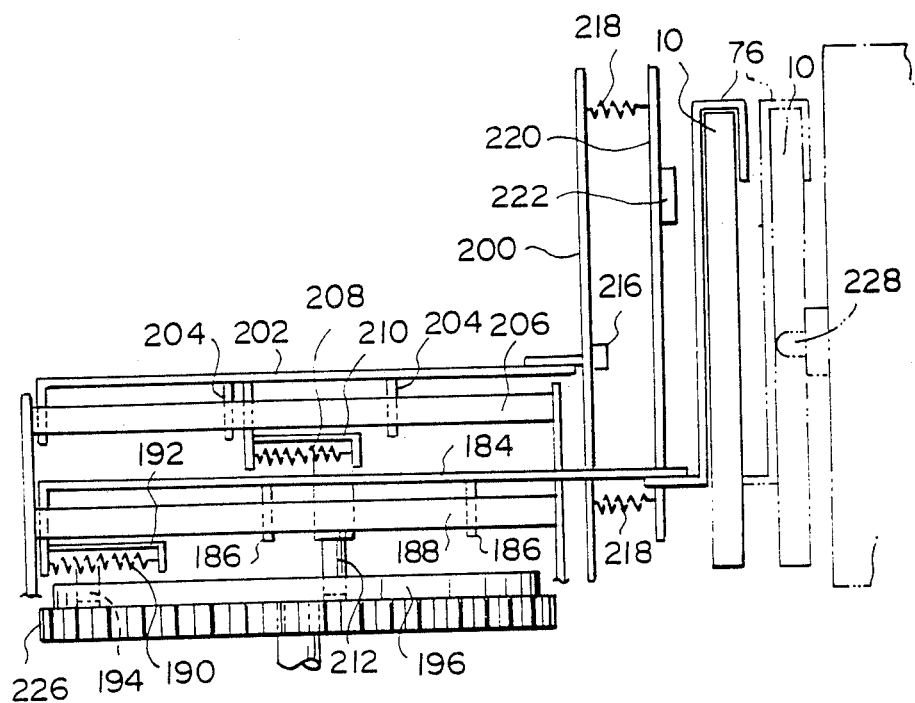
F I G.14

DEVICE FOR AUTOMATICALLY CHANGING MAGNETIC DISC PACK

BACKGROUND OF THE INVENTION

1. Field of the Invention

This invention relates to a device for automatically changing a magnetic disc pack, and more particularly to a device for automatically changing a magnetic disc pack, suitable for the continuous reproduction of a plurality of magnetic disc packs having recorded therein still image information and the like.

2. Description of the Prior Art

Recently, there has been developed an electronic still camera system wherein an image pickup device such as a charge coupled device (CCD) or an image pickup tube is combined with a recording device using a magnetic disc which is inexpensive as a recording medium and yet has a comparatively high memory capacity. In operation, a subject is still-photographed electronically and recorded into a rotating magnetic disc, and the reproduction of an image is carried out by a television system, a printer and the like, which are separately provided.

The magnetic disc utilized in the above-described system is generally used in the form of a magnetic disc pack. The magnetic disc pack has rotatably mounted therein a magnetic disc capable of magnetically recording therein still image information and the like, and is used, by being installed in a rotary magnetic disc device assembled into an electronic camera or the like.

On the other hand, recently, there has been utilized a so-called television photo album, wherein photographed subjects such as photographic negative films, prints and the like are recorded for storage in a magnetic disc for an electronic camera and, reproduced by a reproducer as necessary, the images being projected on a screen of a television for entertainment. Along with this, such a service will shortly become available that, similarly to the photographic print service, photographic pictures formed on a negative film and the like are image-sensed in a photographic processing laboratory, recorded in a magnetic disc, and the magnetic disc thus recorded is delivered to a customer.

Now, with the above-described television photo album, there are some cases where it is desired to continuously reproduce a plurality of magnetic discs on a television screen. In such cases as described above, it is troublesome to install the magnetic disc packs one after another on a reproducer. In consequence, if there would be a device for automatically changing a magnetic disc pack, wherein a plurality of magnetic disc packs are installed in the reproducer at a time and the magnetic disc packs are conveyed one after another to a reproducing section in accordance with a predetermined reproduction order, then it would be very convenient.

Now, in such a device for automatically changing a magnetic disc pack as described above, it may be very convenient that the magnetic disc packs are installed in a magazine in blocks of a plural number such as for example ten, and the magazine as a whole is set in the device for automatic change and each of the magnetic disc packs is drawn out of the magazine in accordance with a predetermined reproduction order and set in the reproducing section.

In the device for automatically changing a magnetic disc pack of the type described, if the magazine is inserted into the device for automatic change in a wrong direction, then the magnetic disc pack may not be drawn out of the device for automatic change, and, if the magazine is excessibly forcibly pushed into the device for automatic change, then the magazine and/or the device for automatic change may be damaged.

Furthermore, on the magazine of the above-described device for automatically changing a magnetic disc pack, there is provided a lid for preventing the magnetic disc pack from falling off the magazine. In the device for automatic change, the magazine lid of this type must be in an open state so as to draw out the magnetic disc pack therefrom. It is troublesome to manually perform the operation of opening the lid each time the magazine is inserted into the device for automatic change, and further, there is a possibility of inserting the magazine into the device for automatic change, with the magazine lid being closed.

Furthermore, with the magazine of the magnetic disc pack of the type described, the position and shape of opening of the magazine for drawing the magnetic disc pack out of the magazine in the device for automatic change and for loading the magnetic disc pack should be accomplished without any wasteful motion.

Additionally, it is necessary to house the magnetic disc packs in the magazine being aligned in a predetermined direction.

SUMMARY OF THE INVENTION

The present invention has been developed to obviate the above-described disadvantages of the prior art and has as another object thereof the provision of a device for automatically changing a magnetic disc pack, wherein a plurality of magnetic disc packs can be automatically set one after another in a reproducing section in accordance with a predetermined reproduction order.

To the above end, the present invention contemplates that, in a device for automatically changing a magnetic disc pack, wherein a magazine loaded therein with a plurality of magnetic disc packs each housing therein a magnetic disc is inserted and each of the magnetic disc packs in drawn out of the magazine in accordance with a predetermined order and set in a reproducing section, the device for automatic change comprises:

a main body of device;

a magazine reciprocation means insertable and withdrawable through an opening formed in the front surface of the main body of device, for reciprocating the magazine in the axial direction of the main body;

a random access mechanism for reciprocating the magazine of the main body of device in a direction perpendicularly intersecting the axial direction and moving the magnetic disc pack selected in accordance with a predetermined reproduction order to a position where a holder is standing by;

a magnetic disc pack carrying mechanism capable of being reciprocatingly movable in the axial direction, for drawing out of the magazine the disc pack selected to a position opposed to the holder by the random access mechanism and inserting the magnetic disc pack after the reproduction into the magazine;

a shutter opening-closing mechanism provided on the holder, for opening a shutter when the magnetic disc pack is inserted into the holder and closing the shutter when the magnetic disc pack is drawn out of the holder; and a magnetic disc pack loading mechanism capable of reciprocatingly moving the magnetic disc pack in the holder in a direction perpendicularly intersecting the axial direction, for guiding the magnetic disc pack to a position where the magnetic disc pack is mounted to a driving shaft of the reproducing section.

Furthermore, the present invention has been developed to obviate the above-described disadvantages of the prior art and has its object the provision of a device for automatically changing a magnetic disc pack, wherein a magnetic disc pack can be drawn one after another out of the magazine inserted into the device for automatic change.

To the above end, the present invention contemplates that, in a device for automatically changing a magnetic disc pack, wherein the device is inserted thereinto with a magazine having loaded therein a plurality of magnetic disc packs each housing therein a magnetic disc and formed thereon with a recess for engagement, and the magnetic disc packs are drawn one after another out of the magazine in accordance with a predetermined order and set in a reproducing section, the device for automatic change comprises: a carry-out member having a pawl engageable with the aforesaid recess; and a cam for engaging the pawl of the carry-out member with the aforesaid recess when the magnetic disc pack is drawn out, and retracting the pawl from the recess during loading.

Furthermore, the present invention has been developed to obviate the above-described disadvantages of the prior art and has as its object the provision of a device for automatically changing a magnetic disc pack with a simplified construction, capable of preventing a magazine having housed therein a plurality of magnetic disc packs from being erroneously inserted.

To this end, the present invention contemplates that, in a device for automatically changing a magnetic disc pack, wherein a magazine loaded therein with a plurality of magnetic disc packs each housing therein a magnetic disc is inserted and each of the magnetic disc packs is drawn out of the magazine in accordance with a predetermined order and set in a reproducing section, a magazine bearer of the device for automatic change is constructed in a manner to be insertable and withdrawable and provided at a surface thereof for bearing the magazine with a projection for preventing erroneous mounting, which is complementary to a cutout of the magazine.

The present invention also has been developed to obviate the above-described disadvantages of the prior art and has as a further object thereof the provision of a device for automatically changing a magnetic disc pack, wherein, when a magazine is inserted into the device for automatic change, a lid of the magazine is automatically opened, so that the magnetic disc pack can be taken out.

To the above end, the present invention contemplates that, in a device for automatically changing a magnetic disc pack, wherein a magazine loaded therein with a plurality of magnetic disc packs each housing therein a magnetic disc is inserted and each of the magnetic disc packs is drawn out of the magazine in accordance with a predetermined order and set in a reproducing section, a lid opening-closing member is provided in an area where the magazine is inserted, and the lid opening-closing member is rotated in association with the inserting operation of the magazine, to thereby open a magazine lid.

The present invention also has been developed to obviate the above-described disadvantages of the prior art and has as a still further object thereof the provision of a magazine of a magnetic disc pack, which is applicable to the interior of a device for automatically changing the magnetic disc pack.

To the above end, the present invention contemplates that, in a magazine of a magnetic disc pack, wherein a plurality of magnetic disc packs each housing therein a magnetic disc are aligned with one another and loaded, the magazine is formed with an opening for loading the magnetic disc pack, an opening for drawing out the magnetic disc pack and a plurality of grooves, through which is passed a carryout member to be engaged with the magnetic disc pack when the magnetic disc pack is drawn out, to thereby draw the magnetic disc pack out of the magazine.

To the above end, the present invention contemplates that, in a magazine of a magnetic disc pack, wherein a plurality of magnetic disc packs each housing therein a magnetic disc are aligned with one another and loaded, the magazine is formed with an opening for loading the magnetic disc pack and an opening for drawing out the magnetic disc pack, and the opening for drawing out the magnetic disc pack is provided thereon with an openable lid and the openable lid is formed with a sensing surface matching with a direction regulating surface of the magnetic disc pack.

To the above end, the present invention contemplates that, in a magazine of a magnetic disc pack, wherein a plurality of magnetic disc packs each housing therein a magnetic disc are aligned with one another and loaded, a magnetic disc pack housing portion of the magazine is disappearingly provided with a sensing member, which is biased by a resilient member to be positioned in an area where the magnetic disc pack is housed, and a surface of the sensing member abutting against the magnetic disc pack is formed in a direction perpendicularly intersecting the direction of insertion of the magnetic disc pack.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is a perspective view of the magnetic disc pack magazine from the front thereof;

FIGS. 3 and 4 are side sectional views of the magnetic disc pack magazine, taken along the line Y—Y in FIG. 2;

FIG. 14 is a side view showing the mechanism for loading the magnetic disc pack;

DETAILED DESCRIPTION OF THE INVENTION

Detailed description will hereunder be given of the preferred embodiment of the device for automatically changing a magnetic disc pack according to the present invention with reference to the accompanying drawings.

Figure 17:
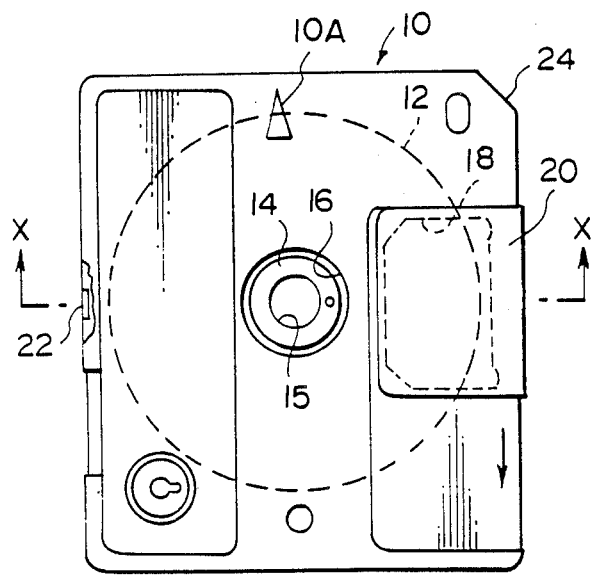
FIG. 17 is a plan view showing the magnetic disc pack.
Figure 18:
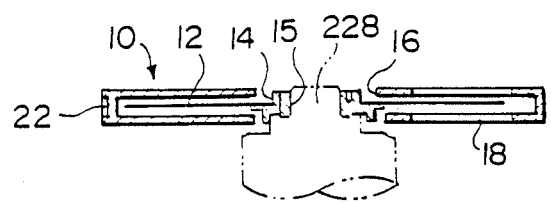
FIG. 18 is a sectional view taken along the line X—X in FIG. 17.

FIG. 17 is a plan view showing a magnetic disc pack used in a magnetic recorder and/or reproducer in an electronic camera or the like, and FIG. 18 is a sectional view taken along the line X—X in FIG. 17. As shown in FIG. 17, the magnetic disc pack 10 is formed into a generally square shape and has rotatably mounted therein a magnetic disc 12 capable of recording therein still image information and the like. The magnetic disc 12 is provided in the central portion thereof with a center core 14 as being a reinforcing member, which is exposed to the outside through a circular opening 16 of the magnetic disc pack 10. The center core 14 is formed with a center hole 15. The center hole 15 is formed with an elastic piece, not shown. A driving shaft 228 to be described hereunder is coupled into the center hole 15 of the center core 14 against a biasing force of this elastic piece. The magnetic disc pack 10 is formed with a window 18, at which is located a magnetic head to be described hereunder. This window 18 for the magnetic head is opened or closed by a slidable shutter 20. More specifically, before the magnetic disc pack 10 is inserted into a holder 76 to be described hereunder, the shutter 20 closed the window 18 to prevent dust from adhering to the magnetic disc 12. After the magnetic disc pack 10 is inserted into the holder 76 to be described hereunder, the shutter 20 moves downward in FIG. 17 to open the windoe 18 for the magnetic head, so that recording into the magnetic disc 12 or reproducing therefrom can be effected. In the magnetic disc pack 10, a recess 22 for engaging is formed at a side edge opposite to the shutter 20. This recess 22 is used for drawing the magnetic disc pack 10 out of the magazine 25 to be described hereunder when the magnetic disc pack 10 is inserted into the holder 76. The right corner portion of the top end of the magnetic disc pack 10 in FIG. 17 is cut away in a tapered shape so as to form a tapered surface 24 for preventing the magnetic disc pack 10 from being erroneously inserted into the magazine 25. Additionally, designated at 10A is an arrow mark formed on the magnetic disc pack 10, for indicating a direction of insertion.

Figure 2:
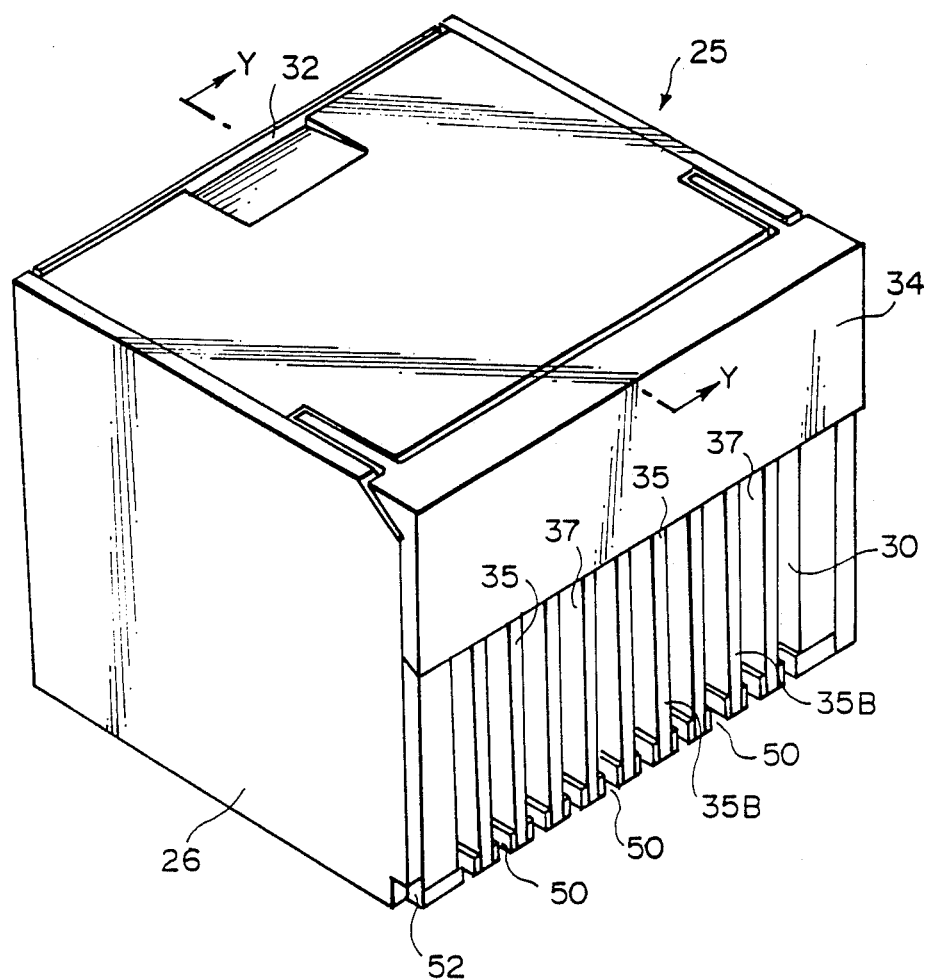
FIG. 2 is a perspective view of the magnetic disc pack magazine from the rear thereof.

FIGS. 1 to 4 are drawings showing the shape of the magnetic disc pack magazine 25, into which a plurality of e.g. ten of magnetic disc packs are loaded, FIG. 1 being a perspective view of the magnetic disc pack magazine 25 from the front, FIG. 2 being a perspective view thereof from the rear, and FIGS. 3 and 4 being side sectional views taken along the line Y—Y in FIG. 2. A main body 26 of the magazine is made of a transparent plastics material, formed into a box form, and the front surface 28 and the rear surface 30 being formed into open end faces. A front lid 32 is provided on the front surface of the magazine 25, and the bottom end portion of the front lid 32 is rotatably supported by the main body 26 of the magaine, so that the front surface 28 can be opened or closed. Furthermore, a rear lid 34 is provided on the rear surface 30, and the rear lid 34 is rotatably provided at the top end of the main body 26 of magazine, so that, as shown in FIG. 2, the rear lid 34 can cover a portion, i.e. substantially one third of the rear surface 30 of the main body 26 of the magazine. Partition plates 35 ar arranged in the main body 26 of magazine at regular intervals. These partition plates 35 are relatively low in height on the front surface's side so as to form each partition partially upward from the bottom. However, the partition plates 35 are relatively high in height on the rear surface's side so as to partition the magazine entirely from bottom to top. The magnetic disc packs 10 being in the vertical positions can be inserted into or taken out of spaces 37 formed by these partition plates 35. Ten of the spaces 37 are formed in one magazine 25, so that ten magnetic disc packs 10 can be housed therein.

As shown in FIG. 3, a tapered sensing surface 36 for preventing the magnetic disc pack 25 from being erroneously inserted is provided at the inside of the rear lid 34. This sensing surface 36 is opposed to the tapered surface 24 of the magnetic disc pack 10. In consequence, when the sensing surface 36 on the side of the magazine 25 matches with the tapered surface 24 of the magnetic disc pack 10, the magnetic disc pack 10 is received in the main body 26 of magazine as shown in FIG. 3, and the front lid 32 can be completely closed as indicated by solid lines in FIG. 3. Whereas, when the magnetic disc pack 10 is erroneously inserted in a different direction and the tapered surface 24 of the magnetic disc pack 10 does not match with the sensing surface 36, as shown in FIG. 4, the magnetic disc pack 10 is not completely inserted, partially projects from the magazine 25, the bottom portion 32A of the front lid 32 abuts against the bottom end portion 10A of the magnetic disc pack 10, and it be becomes difficult for the front lid 32 to be completely closed. With this arrangement, an erroneous insertion of the magnetic disc pack 10 is found through an incomplete closing of the front lid 32.

A toggle spring 42 is provided at a hinge portion of the rear lid 34, which is held by this toggle spring 42 at either one of two positions including a closed position indicated by solid lines and an opened position indicated by hypothetical or phantom lines in FIG. 3.

A lock mechanism, not shown, is provided on the rear lid 34, and, when the magazine 25 is loaded in the reproducer the lock is released by a lock releasing pin, not shown, so that the rear lid 34 can be opened or closed.

The magnetic disc packs 10 can be mounted into the spaces 37 formed by the partition plates 35 provided on a bottom plate 48 of the magazine 25, and a groove 50 is formed rearwardly of the bottom plate 48, whereby a pawl 164 for carry-out is introduced into the groove 50 as indicated by hypothetical lines in FIG. 3 during the loading operation of the magnetic disc pack as will be described hereunder.

A cutout 52 is formed in a corner of the rear surface of the main body 26 of the magazine as shown in FIG. 2. This cutout 52 has a function of preventing the magazine from being erroneously mounted when the magazine is set in a reproducer as will be described hereunder.

Figure 5:
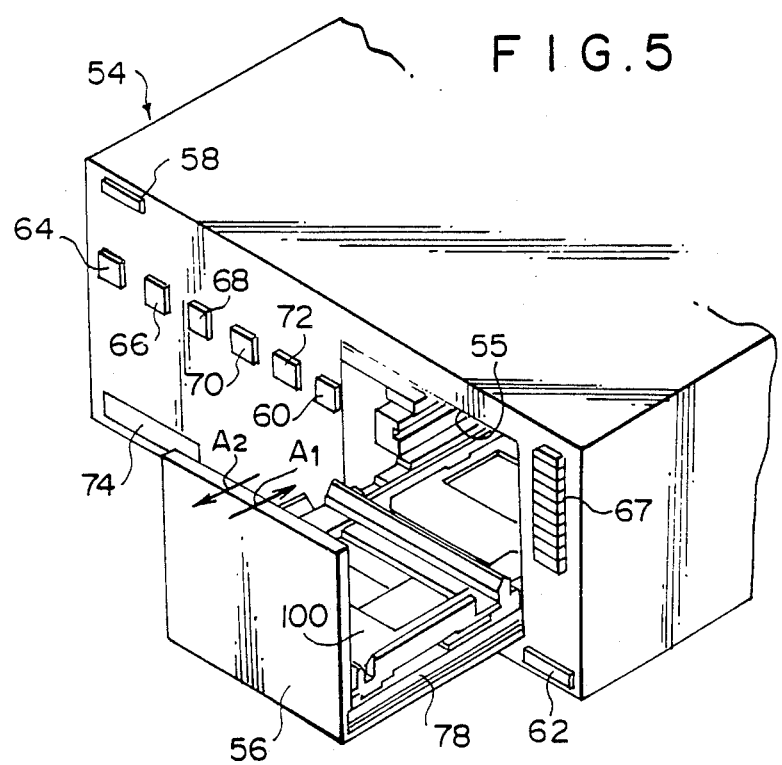
FIG. 5 is a perspective view showing the schematic configuration of the device for automatically changing a magnetic disc pack according to the present invention.

FIG. 5 shows a reproducer 54 in which is inserted the magazine having loaded therein the magnetic disc packs described above. On the front surface of the reproducer 54, there is disposed a lid 56 for loading the magazine in a manner to be slidable in a direction indicated by an arrow $A_1$ or $A_2$. Also provided are a power switch 58, a start button 60, an ejection button 62, a recording button 64, a display button 66, a program button 67 for setting a reproduction order for the magnetic disc packs, a pack change button for changing a pack half way, (i.e., not waiting for the completion of reproduction of the pack), a forward feed button 70 for the magnetic head, a reverse feed button 72, a remote controller 74 and the like.

Figure 6:
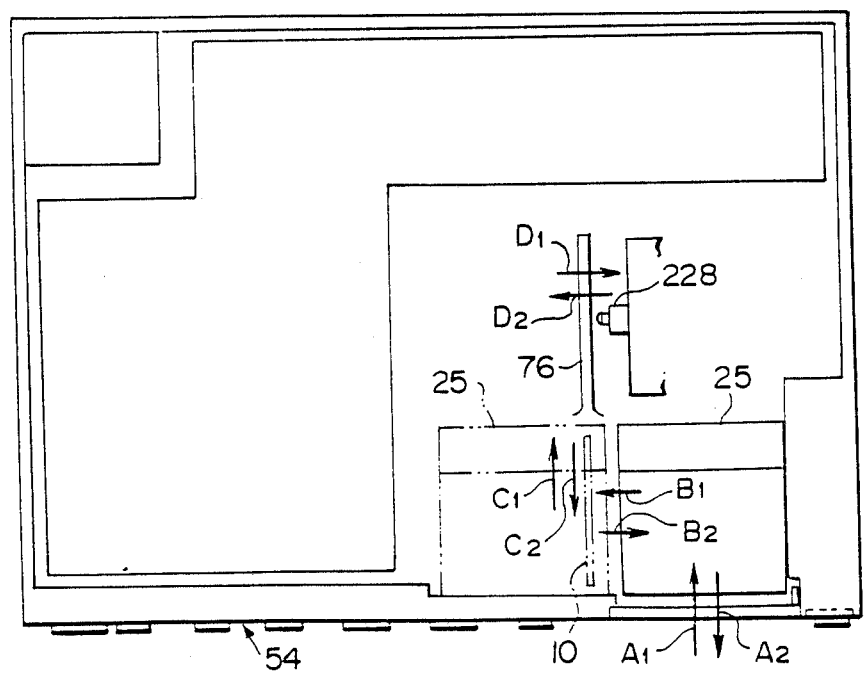
FIG. 6 is an explanatory view showing the moving direction of the magnetic disc pack in the device for automatically changing the magnetic disc pack.

Description will now be given of moving directions of the magazine 25 and the magazine disc pack 10 in the reproducer 54. Firstly, the magazine 25 is moved in the axial direction of the reproducer 54, i.e. in the direction indicated by the arrow $A_1$, as shown in FIG. 6. When the magazine 25 is completely received in the reproducer 54, the magazine 25 is moved to the left in FIG. 6, i.e. in a direction indicated by an arrow $B_1$. A holder 76 is standing by at a predetermined position, and the magazine 25 makes such a positioning that the magnetic disc pack 10 is located at a position selected to meet the position of the holder 76, and stops thereat. Only the magnetic disc pack 10 is moved in a direction indicated by an arrow $C_1$ and loaded into the holder 76, with the magazine 25 being stopped at this position. This holder 76 is moved to the side of the magnetic head, i.e. in a direction indicated by an arrow $D_1$, and the magnetic disc pack 10 is mounted to a rotary driving shaft 228. To change the magnetic disc pack 10, the preceding steps are reversed, i.e. the holder 76 moves in a direction indicated by an arrow $D_2$, the magnetic disc pack 10 moves in a direction indicated by an arrow $C_2$ and the magnetic disc pack 10 is loaded at a predetermined position of the magazine 25 in the stand-by position, and magazine 25 is random accessed in the direction indicated by the arrow $B_1$ or $B_2$. In this state, the magazine 10 is stopped at a required position, and a succeeding magnetic disc pack 10 is delivered into the holder 76. Upon completion of reproduction of a required number of discs, the magazine is delivered in the direction indicated by the arrow $B_1$, and further, sent in the direction indicated by the arrow $A_2$, so that the magazine can be taken out of the reproducer 54.

Figure 7:
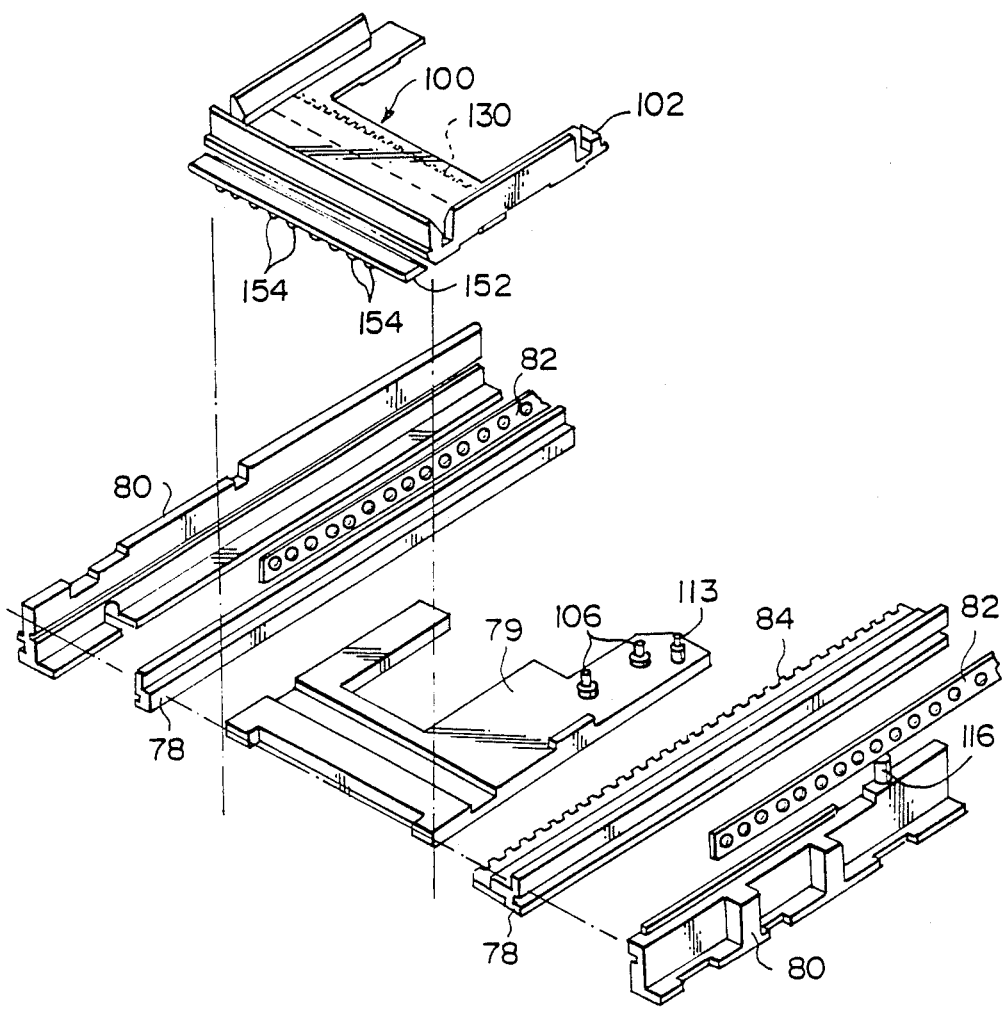
FIG. 7 is a disassembled perspective view showing the construction of the magazine bearer.

Description will hereunder be given of a mounting mechanism of the magazine 25. The bottom end portions of the loading lid 56 are solidly secured to the forward end portions of a pair of rails 78 and 78 which are movable relative to the reproducer 54. These rails 78 and 78 are connected to each other through a bottom plate 79. As shown in FIG. 7, the rails 78 and 78 are slidably supported by support members 80 and 80 on the main body of device through bearings 82 and 82, so that a magazine loading assembly including the loading lid 56, the rails 78 and the bottom plate 79 is movable in the axial direction of the reproducer, i.e. in the direction indicated by the arrow $A_1$ or $A_2$. One of the rails 78 is formed thereon with a rack 84, which is rotatably driven by a pinion 86 shown in FIG. 8. The pinion 86 is driven by a motor 88 shown in FIGS. 8 and 9. More specifically, the motor 88 rotatably drives the pinion 86 through gears 90, 92, 94, 96 and 98, which are connected to an output shaft of the motor 88. With this arrangement, the magazine loading assembly can advance in the axial direction (direction indicated by the arrow $A_2$) and be retracted (in the direction indicated by the arrow $A_1$).

Description will hereunder be given of a mechanism for preventing a magazine from being erroneously inserted. As shown in FIG. 7, on the magazine loading assembly, a U-letter shaped magazine bearer 100 is movable along a guide portion 101 shown in FIG. 9 in a direction perpendicularly intersecting the axial direction, and this magazine bearer 100 can move in directions indicated by arrows $B_1$ and $B_2$ in FIG. 6. This magazine bearer 100 is provided thereon with a projection 102 complementary to the cutout 52 of the magazine 25. When the magazine 25 is erroneously mounted on the magazine bearer 100, i.e. the cutout 52 does not match in position with the projection 102, the magazine 25 is not properly mounted on the magazine bearer 100. In consequence, in this state, the magazine 25 cannot be inserted into an opening 55 of the main body of reproducer as shown in FIG. 5. With this arrangement, erroneous mounting of the magazine can be sensed.

Figure 8:
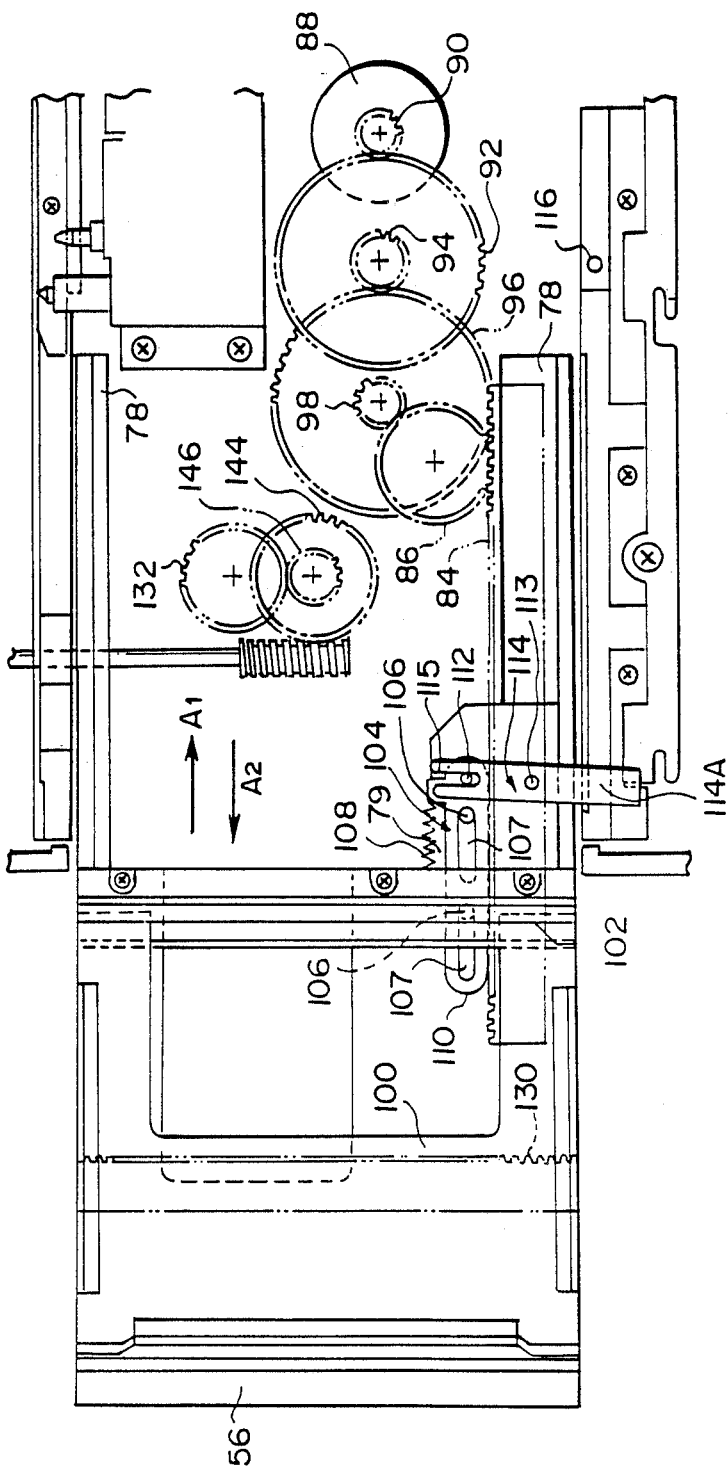
FIG. 8 is a plan view showing the magazine driving mechanism in the reproducer when the magazine bearer is opened.
Figure 9:
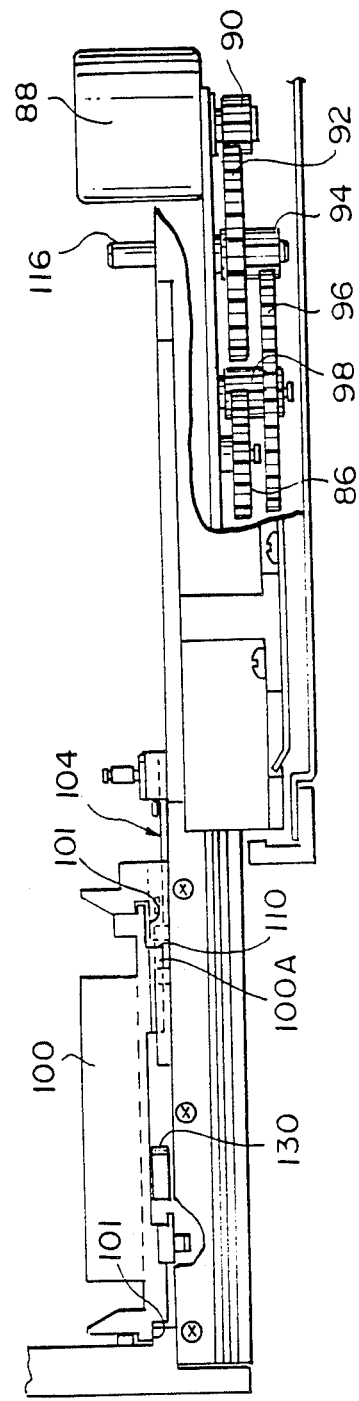
FIG. 9 is a side view of FIG. 8.
Figure 10:
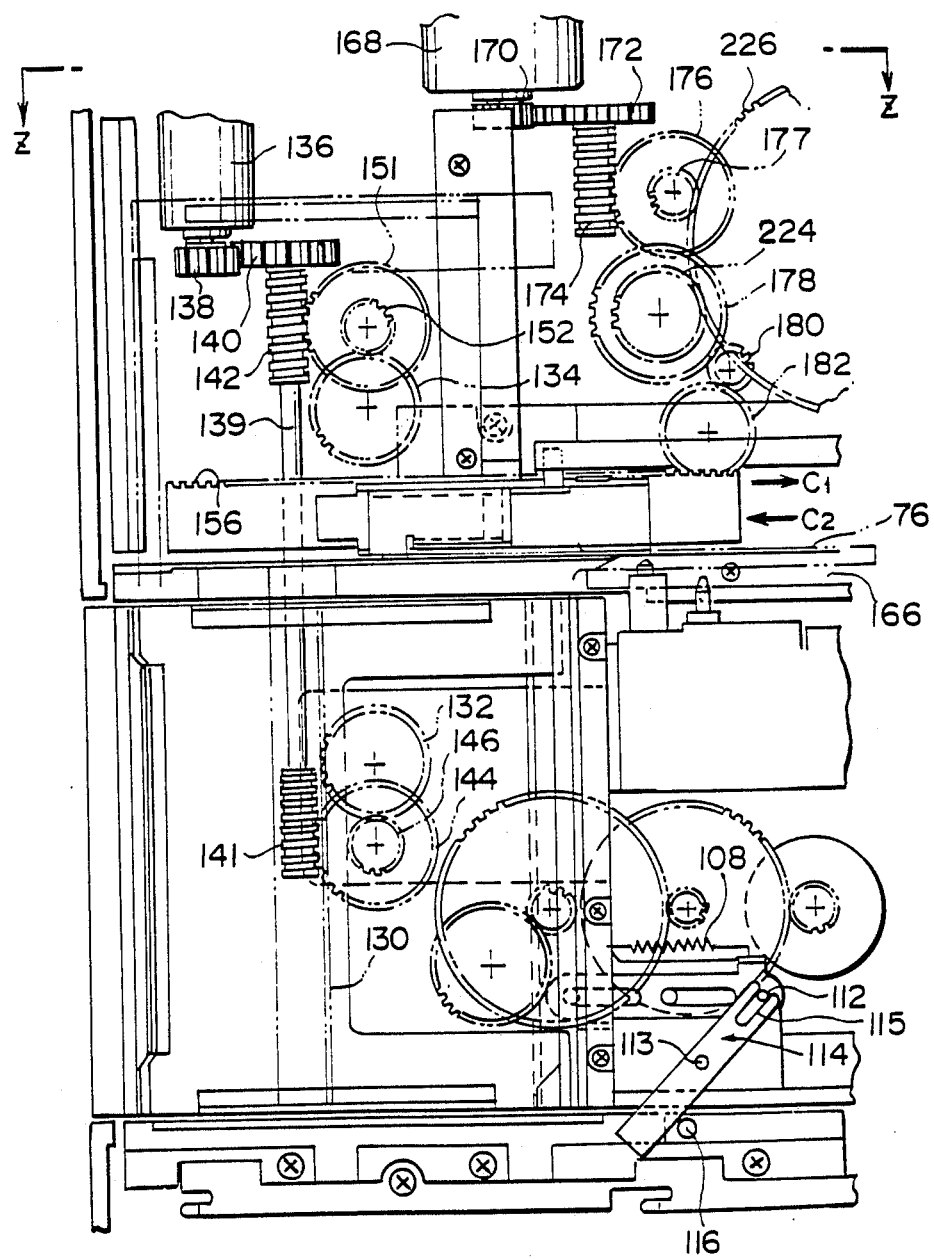
FIG. 10 is a plan view showing the magazine driving mechanism in the reproducer when the magazine bearer is closed.

The bottom plate 79 of the magazine loading assembly is provided with a lock mechanism for preventing the magazine bearer 100 from moving. More specifically, as shown in FIG. 8, a lock lever 104 is formed with slots 107 and 107. Pins 106 and 106, which are mounted on the bottom plate 79, are loosely coupled into the slots 107 and 107, so that the lock lever 104 is movable within a distance permitted by the slots disposed from the right to the left in FIG. 8. The lock lever 104 is biased by a biasing force of a spring 108 to the left in FIG. 8, and an end portion 110 thereof is positioned in a moving area of the magazine bearer 100, i.e. the moving area in the direction indicated by the arrow $B_1$. In this state, a stepped portion 100A of the magazine bearer 100 is immovable because of the engagement with the end portion 110. Furthermore, a pin 112 is mounted on the right end portion of the lock lever 104 and engaged with a groove 115 of a rocking lever 114. When the rails 78 and 78 are moved in the direction indicated by the arrow $A_1$ by the pinion 86 from the state shown in FIG. 8, the magazine bearer 100 is moved in the direction indicated by the arrow $A_1$, and an end portion 114A of the rocking lever 114 abuts against a lock releasing pin 116, and the rocking lever 114 rotates about a shaft 113 in the clockwise direction as shown in FIG. 10, so that the lock lever 104 can be retracted from the moving area of the magazine bearer 100 against the biasing force of the spring 108. At this time, the magazine 26 is completely installed in the reproducer 54. In consequence, unless the magazine 25 is completely inserted into the main body of reproducer 54, the magazine bearer 100 cannot move in the direction indicated by the arrow $B_1$.

Figure 11:
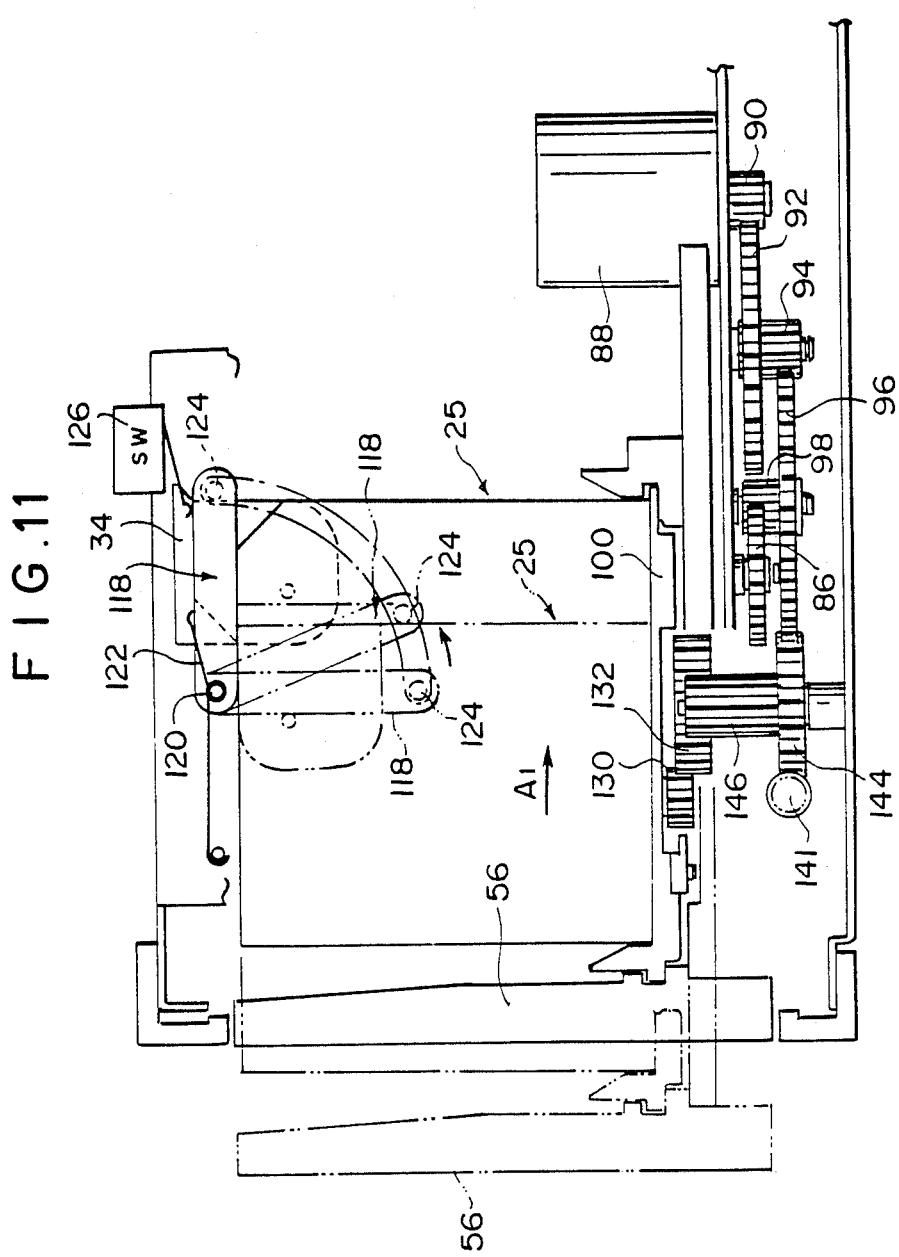
FIG. 11 is a side view showing the inserted state of the magazine.
Figure 12:
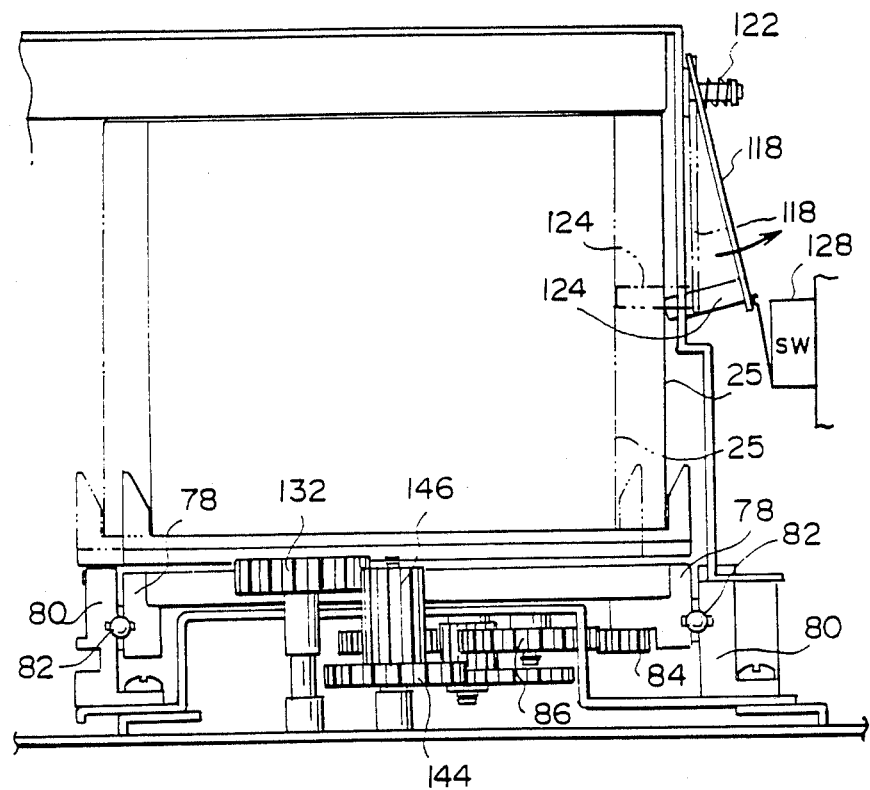
FIG. 12 is a front view showing the inserted state of the magazine.

Description will hereunder be given of a mechanism for opening or closing the rear lid 34. In the insertion area of the magazine 25 in the direction indicated by the arrow $A_1$, a rear lid opening-closing lever 118 is provided as shown in FIGS. 11 and 12. More specifically, the rear lid opening-closing lever 118 is supported on the main body or the device in a manner to be rotatable about a shaft 120, biased by a spring 122 in the clockwise direction in FIG. 11, and a pin 124 provided on the forward end portion thereof is positioned in the insertion area of the magazine 25. In consequence, when the magazine 25 is moved in the direction indicated by the arrow $A_1$ along with the movement of the magazine loading assembly, a magazine rear lid lock releasing pin, not shown, provided on the main body of device abuts against the lock mechanism, not shown, provided on the magazine 25, so as to release the lock of the rear lid. Subsequently, the rear lid opening-closing lever 118 abuts against an edge face of the magazine 25 on the side of the open end 30, whereby the lever 118 rotates against the biasing force of the spring 122 in the counterclockwise direction in FIG. 11. This push-in of the magazine 25 slowly rotates the rear lid opening-closing lever 118 in the counterclockwise direction, whereby the rear lid 34 is slowly opened. The lever 118 abuts against a switch 126 at a position where the rear lid 34 is completely opened, so as to close the switch 126. Upon closing of the switch 126, the bearer 110 performs the succeeding action, i.e. moves in the direction indicated by the arrow $B_1$. As described above, unless the bearer 100 is completely inserted into the reproducer 54, the bearer 100 does not move in the direction indicated by the arrow $B_1$. Additionally, the switch 126 can perform an additional function of detecting the presence of the magazine. The spring 122 is formed into a torsional compression spring, and swings to the right as shown in FIG. 12 while the magazine 25 returns in the direction indicated by the arrow $B_2$, so as to close a switch 128. The switch 128 detects the return of the magazine 25, and, when the switch 128 is closed, the magazine 25 is moved in the direction indicated by the arrow $A_2$.

Description will hereunder be given of the random access mechanism. Referring to FIG. 7 again, a rack plate 130 is secured to the undersurface of the magazine bearer 100, and the rack plate 130 is resiliently supported on the bearer 100 through a spring or the like, not shown. The rack plate 130 is in mesh with a pinion 132 as shown in FIGS. 8 and 10 at the final insertion position of the magazine in direction indicated by the arrow $A_1$. When the rack plate 130 and the pinion 132 are in mesh with each other, the rack plate 130 is resiliently supported by the bearer 100, whereby the rack plate 130 is movable while in mesh, so that the rack plate 130 can easily be brought into mesh with the pinion 132. A gear identical with the pinion 132 is disposed upwardly of the pinion 132 in FIG. 10 as a pinion 134. These pinions 132 and 134 are driven by a motor 136. More specifically, a gear 138 provided on an output shaft of the motor 136 is in mesh with a gear 140, which is integrally formed thereon with a worm 142, with which is interlocked a worm 141 through a shaft 139, which formed integrally on the worm 142. The worm 141 integrally formed on the shaft 139 rotates the pinion 132 through gears 144 and 146, and further, rotates the pinion 134 through gears 151 and 152.

As shown in FIG. 7, a position control plate 152 is provided on the undersurface of the magazine bearer 100, and pins 154 equal in number to the spaces 37 of the magazine 25, into which spaces are inserted the packs 10, are provided on the undersurface of this position control plate 152. The position control plate 152 moves together with the magazine bearer 100, and a limit switch, not shown, is provided in a moving area of the position control plate 152, whereby the movement value is found by the number of the openings and closings of the limit switch due to the movements of the position control pins 154, so that a selected magnetic disc pack 10 can be positioned as opposed to the holder 76. The movement value of the magazine need not necessarily be limited to be detected by the pins and the limit switch, and may be detected by a slit, an optical sensor or the like.

Figure 13:
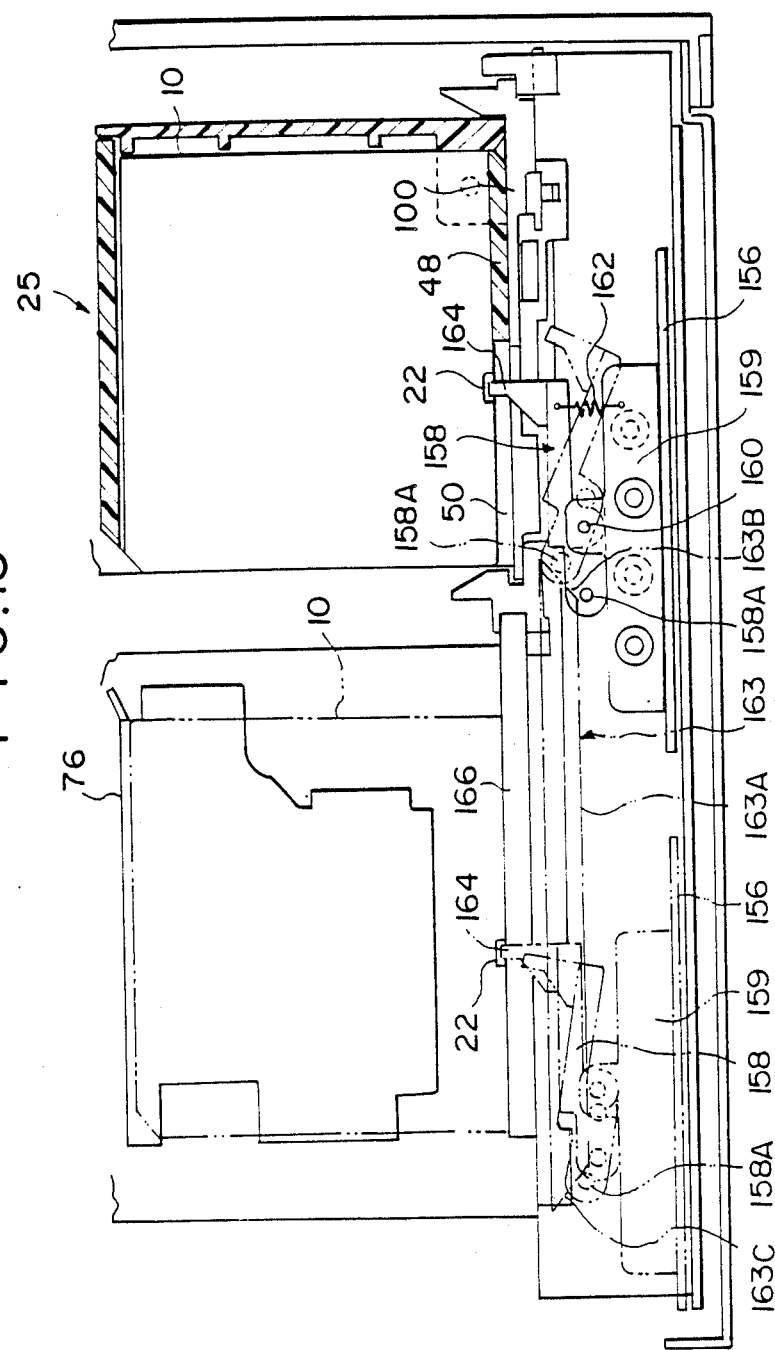
FIG. 13 is a side view showing the mechanism for carrying the magnetic disc pack into the magazine or carrying out the same therefrom, taken along the line Z—Z in FIG. 10.

Description will hereunder given of the carry-in and carry-out mechanism for the magnetic disc pack with reference to FIGS. 11 and 13. As shown in FIG. 10, a rack plate 156 is provided adjacent the position where the holder 76 is provided, this rack plate 156 is solidly secured thereto with a base 159 of a carry-out lever 158 shown in FIG. 13, and the carry-out lever 158 is provided on the base 159 in a manner to be rotatable about a shaft 160. The carry-out lever 158 is biased by a spring 162 in a manner to be rotatable in the clockwise direction in FIG. 13. In abutting contact with a cam surface 163B or 163C of a cam 163, the carry-out lever 158 is inclined as indicated by two-dots chain lines in FIG. 13. However, when a pin 158A at the rear end portion of the carry-out lever 158 is pressed by a cam surface 163A of the cam 163, the carry-out lever 158 is erected as indicated by solid lines in FIG. 13. The carry-out lever 158 is provided at the forward end portion thereof with a pawl 164, which has a size so small as to be able to pass through the groove 50 of the magazine 25. In consequence, when the pawl 164 is erected by the cam 163 and positioned in the groove 50 as shown in FIG. 13, the pawl 164 is coupled into the recess 22 of the magnetic disc pack 10 housed in the magazine 25. In this state, when the rack plate 156 is moved to the left in FIG. 13, only the magnetic disc pack 10 engaged with the pawl 164 is moved and drawn out of the magazine 25 which is standing by at the same position, moved on a pack guide 166, and received in the holder 76 which has been standing by. The holder 76 is formed into an U-letter shape and the pack guide 166 is provided downwardly of the holder 76, so as to guide the magnetic disc pack 10 into the holder 76. When the magnetic disc pack 10 is inserted into the holder 76, the shutter 20 thereof is released and the magnetic disc pack 10 is clamped by a spring, not shown, in the holder 76. When the magnetic disc pack 10 is completely received in the holder 76, the carry-out lever 158 is released from the abutting contact with the cam surface 163A, and rotated again by the spring 162 in the clockwise direction to be inclined, whereby the pawl 164 is disengaged from the recess 22 of the magnetic disc pack 10, so that the magnetic disc pack 10 can be freed from the carry-out lever 158.

Description will hereunder be given of a driving force transmission mechanism of the motor 168 with reference to FIG. 10. A gear 170 provided on an output shaft of the motor 168 is in mesh with a gear 172 and a worm 174 integrally formed with this gear 172 is in mesh with a worm gear 176. A gear 177 integrally formed with the worm gear 176 is in mesh with a gear 226, and the gear 226 is in mesh with a gear 224 as well. The gear 226 is formed integrally on a cam 196. A gear 178 is coaxially provided on the gear 224 which is connected to the gear 178 through a clutch mechanism. This gear 178 can advance (in a direction $C_1$) and return (in a direction $C_2$) the rack plate 156 through a gear 180 and a pinion 182.

In consequence, a turning force of the motor 168, when the clutch is released, is transmitted to the gear 178 as a driving force so as to move the rack plate 156, however, when the clutch is released, is transmitted only to the gear 224 so as to rotate the cam 196 only.

Figure 15:
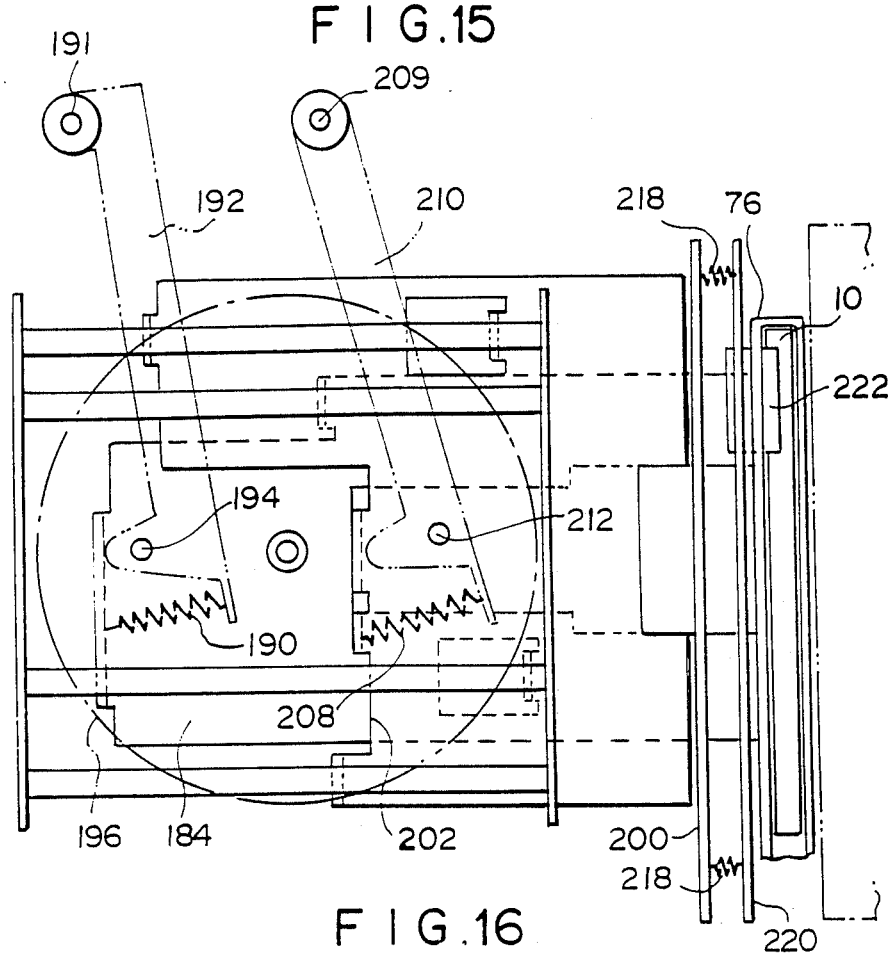
FIG. 15 is a plan view showing the loading mechanism.

Description will hereunder be given of the mechanism for loading the magnetic disc pack 10 with reference to FIGS. 14 and 15. As shown in FIG. 14, a first movable plate 184 is provided at one end portion of the holder 76. This first guide plate 184 is supported on a guide bar 188 through support plates 186 and 186 which are provided on the undersurface of the first movable plate 184 in a manner to be slidable to the right and the left in FIG. 14. A rocking lever 192, whose one end is provotally supported on a pin 191 on the main body's side as shown in FIG. 15, is provided on the first movable plate 184 through a spring 190, and a follower 194 projectingly provided on this lever 192 is moved by a cam 196 shown in FIG. 16. More specifically, the follower 194 is coupled into a groove 198 of the cam 196, and movably controls the first movable plate 184 to the right and the left through the rotation of the cam 196, so as to cause the holder 76 to perform a loading action or an unloading action. On the other hand, a plate 200 is provided with second movable plate 202 which is supported on a guide bar 206 through support plates 204 and 204 in a manner to be movable to the right and the left in FIG. 14. The second movable plate 202 is provided with a rocking lever 210 whose one end is pivotally supported on a pin 209 on the main body's side through a spring 208, and this lever 210 is formed with a follower 212, which is controlled by the cam 196.

Figure 16:
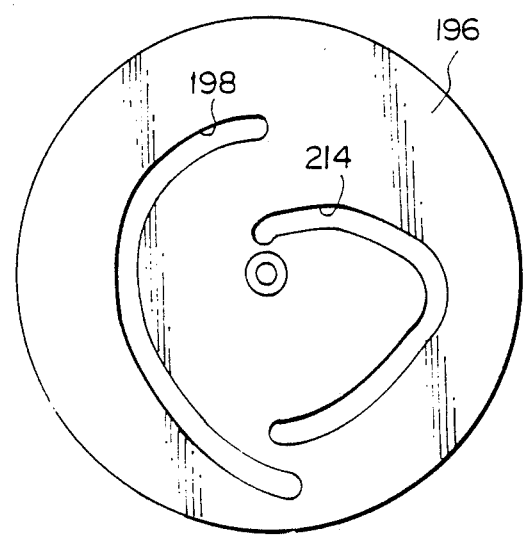
FIG. 16 is an explanatory view showing the contour of the cam.

More specifically, as shown in FIG. 16, the follower 212 is coupled into a groove 214 of the cam 196, whereby the second movable plate 202 is movably controlled to the right and the left through the rotation of the cam 196. The plate 200 is provided thereon with a center core urging member 216 and with another plate 220 through springs 218 and 218. This plate 200 is provided thereon with a regulator plate 222. During loading, the center core 14 of the rotary magnetic disc 12 in the magnetic disc pack 10 is urged toward a driving shaft 228 by the core urging member 216 to make the mounting of the magnetic disc perfect and the regulator plate 222 is located at a position opposed to the magnetic head during the reproduction of the magnetic record to have a function of making the magnetic disc lie along the magnetic head.

The following is the action of the device for automatically changing a magnetic disc pack according to the present invention with the above-described arrangement. Firstly, the loading lid 56 is drawn out into a state shown in FIG. 5 and the magazine 25 housing therein the magnetic disc packs is rested on the bearer 100.

When the start button 60 is pressed in this state, the motor 88 is rotated normally and the pinion 86 is rotated, whereby the rails 78 are drawn into the reproducer 54 in the direction indicated by the arrow $A_1$, through the rack 84 being in mesh with the pinion 86.

The magazine 25 is drawn in the direction indicated by the arrow $A_1$, whereby the rear lid opening-closing lever 118 shown in FIG. 11 rotates to open the rear lid 34. When the magazine 25 is completely received in the reproducer 54, the pin 124 of the opening-closing lever 118 abuts against the switch 126 to actuate the same, whereby the motor 88 is stopped in operation, and subsequently, the motor 136 for driving the bearer 100 is rotated normally.

When the motor 136 is rotated normally, the pinions 132 and 134 are rotated, whereby the bearer 100 is moved in the direction indicated by the arrow $B_1$. The limit switch, not shown counts the number of the pins 154 of the position control plate 152, which have passed, and, when the selected magnetic disc pack 10 comes to the position opposed to the insertion opening of the holder 76, the pack 10 stops. When the motor 168 rotates normally at this position, the turning force from the motor 168 moves the rack plate 156 in the direction indicated by the arrow $C_2$ through the gears 170 to 172. This movement of the rack plate 156 makes the pawl 164 of the carry-out lever 158 engage the recess 22 of the magnetic disc pack 10. In this state, when the carry-out lever 158 together with the rack plate 156 move toward the holder 76 (in the direction $C_1$), the magazine 25 remains at the same position and only the magnetic disc pack 10 is loaded into the holder 76, sliding on the pack guide 166. When the pack 10 is completely received in the holder 76, the carry-out lever 158 is rotated in the clockwise direction in FIG. 13, so as to free the magnetic seat pack 10 in the holder 76, and the clutch mechanism is released, whereby only the cam 196 continues to rotate.

When the cam 196 rotates, firstly, the holder 76 moves in a direction indicated by an arrow $D_1$ to mount the magnetic disc of the magnetic disc pack 10 to the rotary driving shaft 228, subsequently, the plates 200 and 220 move to urge the center core 14 of the magnetic disc 12 toward the driving shaft 228 by use of the center core member 216, and the regulator plate 222 is located at a predetermined position, so that the magnetic disc in the magnetic disc pack 10 can be magnetically recorded or reproduced. When the cam 196 is rotated reversely upon completion of reproduction, the holder 76, the plates 200 and 220 are moved in a direction reverse to the above direction, i.e. a direction indicated by an arrow $D_2$, thus performing and unloading operation. In this state, again, the pawl 154 of the carry-out lever 156 is coupled into the recess 22 in the magnetic disc pack 10. In this state, when the rack plate 156 is moved forwardly, the magnetic disc pack 10 is drawn out of the holder 76 and inserted into the original position in the magazine 25 which has been standing by.

The magazine 25 is moved in the direction indicated by the arrow $B_1$ or $B_2$ in accordance with a present order of production for the magnetic disc pack 10, the magnetic disc packs in the magazine 25 are taken out one after another and reproduced in accordance with the above-described operations. Upon completion of reproduction of all of the packs, the motor 136 is rotated reversely, whereby the magazine 25 is moved in the direction indicated by the arrow $B_2$. When the bearer 100 for the magazine 25 is moved in the direction indicated by the arrow B₂ and positioned on the rails 78, the side surface of the magazine 25 abuts against the pin 124 of the rear lid opening-closing lever 118 as shown in FIG. 12 so as to actuate the switch 128. When the switch 128 is actuated, the motor 136 is stopped in operation, the motor 88 rotates reversely, the bearer 100 is drawn out in the direction indicated by the arrow A₂, and the magazine 25 can be taken out of the reproducer 54.

Figure 19:
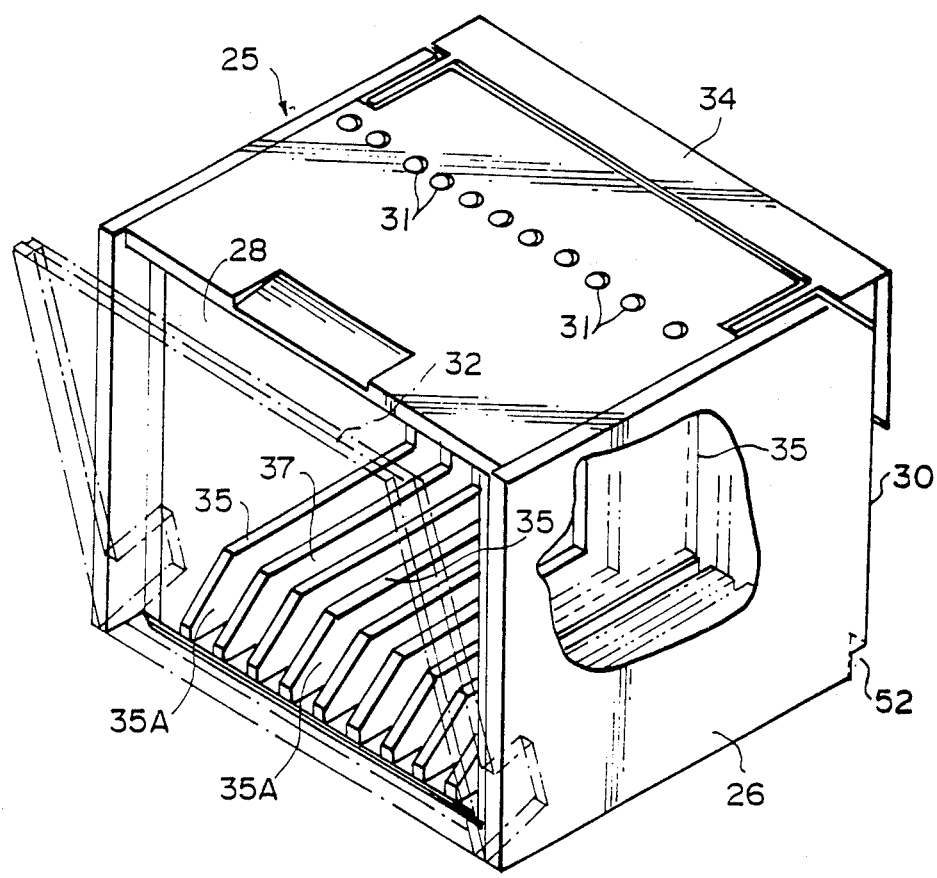
FIG. 19 is a perspective view of another magnetic disc pack magazine from the front thereof.
Figure 20:
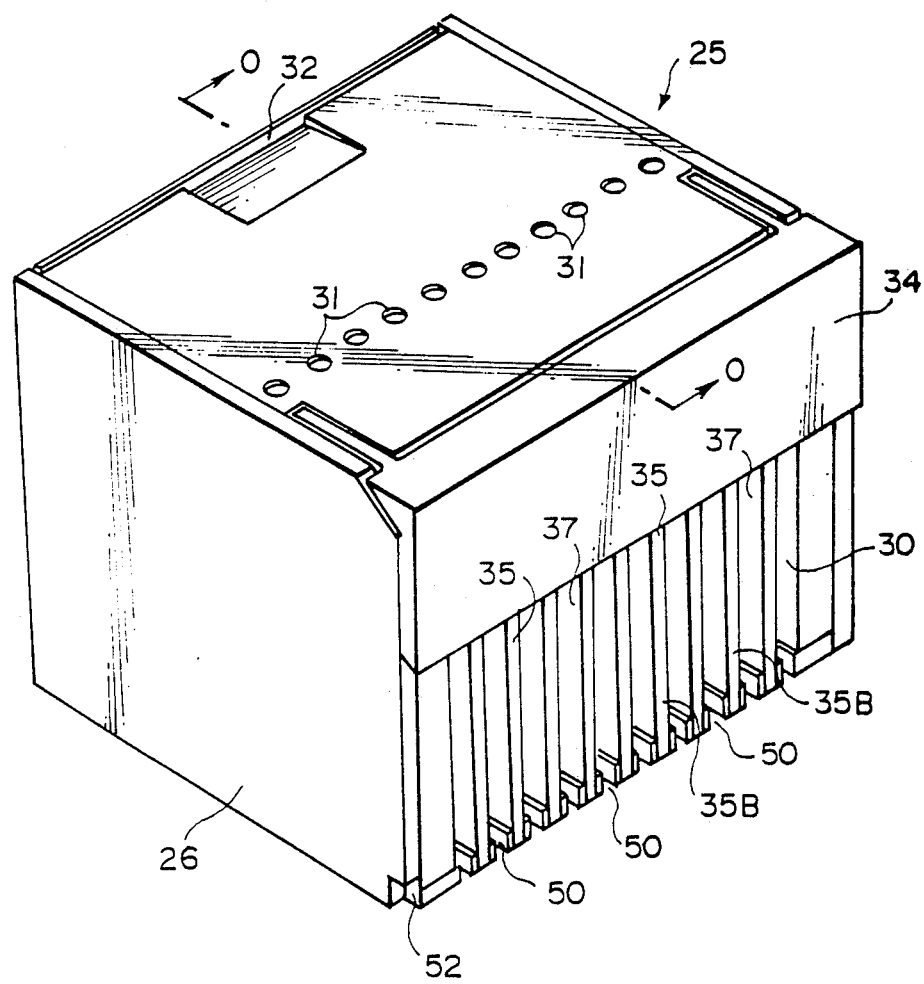
FIG. 20 is a perspective view of the magnetic disc pack magazine shown in FIG. 19 from the rear thereof.
Figure 21:
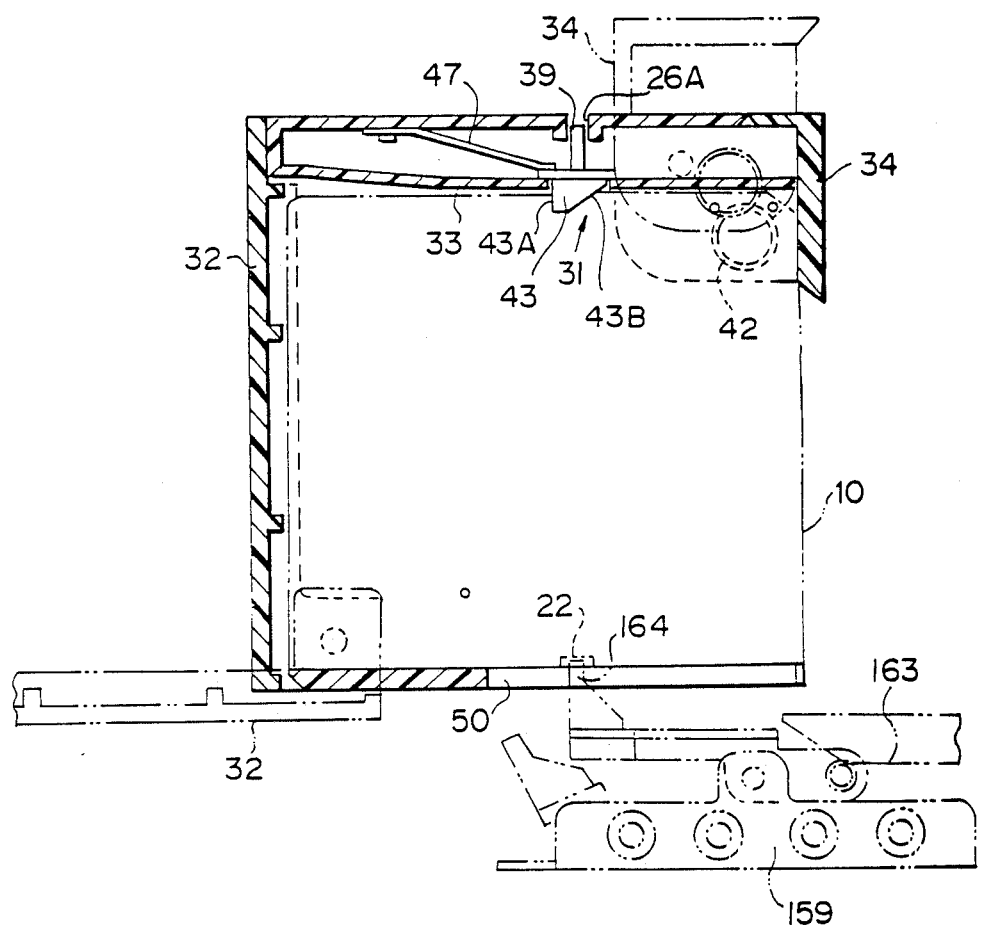
FIG. 21 is a side sectional view of the magnetic disc pack magazine, taken along the line 0—0 in FIG. 20.

FIGS. 19 to 21 are drawings showing the configuration of the magnetic disc pack magazine 25 loaded therein with a plurality, e.g. ten of magnetic disc packs, FIG. 19 being a perspective view from the front thereof, FIG. 20 being a perspective view from the rear thereof and FIG. 21 being a sectional view taken along the line 0—0 in FIG. 20.

Figure 22:
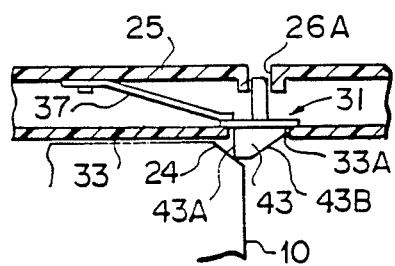
FIGS. 22(A), 22(B) and 22(C) are side sectional views showing the inserted states of the magnetic disc pack.
Figure 22:
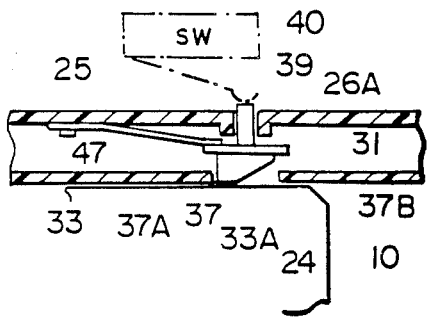
Figure 22:
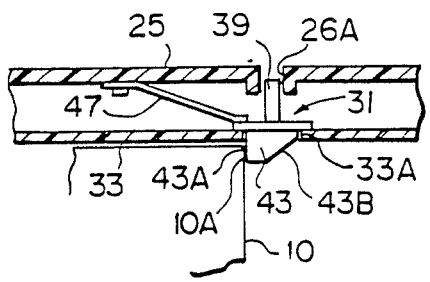

As shown in FIGS. 19 to 21, on the top surface of the main body 26 of magazine, there are provided ten of pack sensing members 31 opposed to the spaces 37 which are the portions for housing the magnetic disc packs 10. Each of the pack sensing members 31 is disappearingly provided in each of holes 33A of an intermediate wall 33 of the main body 26 of magazine an biased by a disc spring 47 so that a raised portion 43 formed at the bottom end portion of the pack sensing member 31 can be positioned in the insertion area of the magnetic disc pack 10. The insertion side of the magnetic disc pack 10, i.e. the left side in FIG. 21 is formed to provide a obstructing surface 43A having a surface perpendicularly intersecting the inserting direction of the pack, whereby erroneous insertion of the magnetic disc pack 10 can be detected. More specifically, when the magnetic disc pack 10 with its tapered surface 24 being disposed at the right side is normally inserted as shown in FIG. 22(A), the pack sensing member 31 is urged up against the biasing force of the disc spring 47 by the tapered surface 24 as shown in FIG. 22(B), so that the magnetic disc pack 10 can be inserted. Whereas, when the magnetic disc pack is erroneously inserted, the side edge 10A of the magnetic disc pack abuts against the obstructing surface 43A as shown in FIG. 22(C), whereby any further insertion becomes impossible, so that the erroneous insertion of the magnetic disc pack 10 can be detected.

The top end portion 39 of the pack sensing member 31 is positioned in a hole 26A of the main body 26 of the magazine 25 as shown in FIG. 21 when the magnetic disc pack 10 is not inserted yet. However, when the magnetic disc pack 10 is inserted to push up the sensing member 31 as shown in FIG. 22(B), the sensing member 31 projects from the hole 26A. In consequence, when a switch 40 is provided on the side of the device for automatic change, if the magnetic disc pack 10 is housed, then the switch 40 is closed at the time of random access, so that the presence of the magnetic disc pack 10 in the magazine can be detected. Furthermore, when the switches 40 equal in number to the sensing members 31 are provided, the presence and position of the magnetic disc pack 10 can be detected simultaneously with the insertion of the magazine 25 into the device for automatic change, and the presence and position are stored by a controller, whereby positions, where the packs are absent, are skipped, so that wasteful movements can be minimized.

Here, the top end portion 39 of the pack sensing member 31 need not necessarily be projected from the hole 26A, and the switch 40 may be located at the hole 26A.

Figure 23:
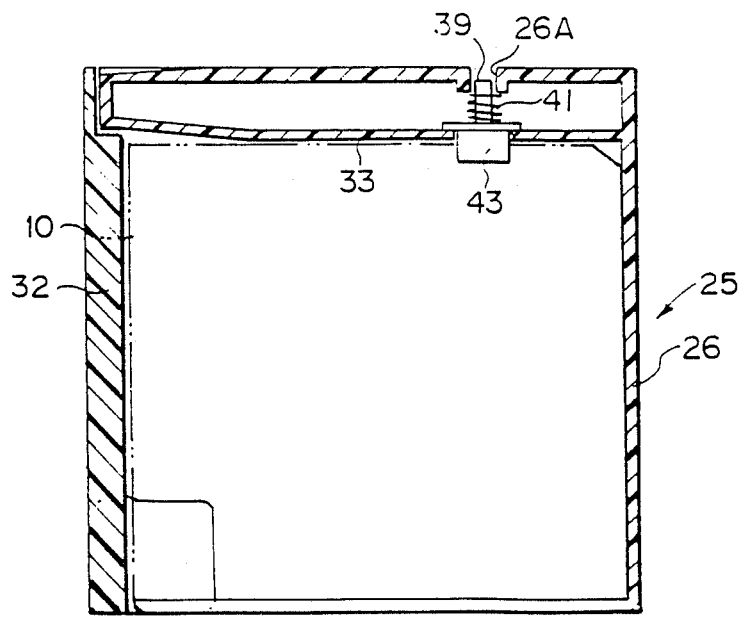
FIG. 23 is a side sectional view showing a modification of the magazine.

A tapered surface 43B is formed on the raised portion 43 at a side opposite to the obstructed surface 43A. The provision of the tapered surface 43B aims at that, upon completion of the loading operation to be described hereunder, during returning movement of the magnetic disc pack 10 to the magazine, the receiving of the magnetic disc pack 10 into the magazine 25 is not obstructed by the sensing member 31. In consequence, as shown in FIG. 23, with the magazine 25 of the type of one-way insertion, the tapered surface 43B can be dispensed with. Furthermore, the biasing force for the sensing member 31 need not necessarily be limited to the disc spring 47, and a coil spring 41 may be used as shown in FIG. 23.

In the device for automatically changing a magnetic disc pack according to the present invention, the device comprises: the magazine carry-in and carry-out mechanism for carrying in and out the magazine in the axial direction of the main body of device; the random access mechanism for moving the magazine in the direction perpendicularly intersection the axical direction and moving the selected magnetic disc pack to the position where the holder is standing by; the magnetic disc pack carry-in and carry-out mechanism for drawing the magnetic disc pack out of the magazine and inserting the same into the holder, and drawing the magnetic disc pack out of the holder upon completion of reproduction and inserting the same into the magazine; the shutter opening-closing mechanism for opening the shutter of the magnetic disc pack when the magnetic disc pack is inserted into the holder and closing the shutter when the magnetic disc pack is drawn out of the holder; and the mechanism for loading the magnetic disc pack, for moving the holder in the direction perpendicularly intersecting the axial direction and guiding the magnetic disc pack to the position where the magnetic disc pack is mounted on the driving shaft of the reproducting section, so that, in continuously reproducing the plurality of magnetic disc packs, the magnetic disc packs can be automatically and continuously reproduced without setting the magnetic disc packs one after another, and no much spaces are required for the movement of the magazine and the loading operation of the magnetic disc pack, thus providing the compact device in size.

In the device for automatically changing a magnetic disc pack according to the present invention, the carry-out member having the pawl engageable with the recess for engagement of the magnetic disc pack is provided, the pawl of the carry-out member is engaged with the recess of the magnetic disc pack by use of the cam during draw-out of the magnetic disc pack and retracted from the recess during unloading, so that the magnetic disc pack can be reliably drawn out of the magazine.

As has been described hereinabove, in the device for automatically changing a magnetic disc pack according to the present invention, a cutout is formed on the magazine and a projection engageable with the cutout is provided on the magazine bearer on the side of the device for automatic change, so that erroneous insertion of the magazine can be avoided by use of a simplified construction without resorting to electrically detecting means or the like.

In the device for automatically changing a magnetic disc pack according to the present invention, the lid opening-closing member is provided in the insertion area of the magazine, and the lid opening-closing member is operated in association with the inserting operation of the magazine to open the lid of the magazine, whereby the opening operation of the magazine lid can be reliably performed, so that the magnetic disc pack is not set in the device for automatic change in the state where the magazine lid is closed.

In the magazine of the magnetic disc pack according to the present invention, the magazine is formed with: the opening for loading the magnetic disc pack; the opening for drawing out the magnetic disc pack during loading; and the opening for passing the conveying member to draw out the magnetic disc pack during loading, so that the magazine can be applied to the device for automatically changing the magnetic disc pack.

In the magazine of the magnetic disc pack according to the present invention, the magazine is formed with the opening for loading the magnetic disc pack and the opening for drawing out the magnetic disc pack, the openable lid is provided on the opening for drawing out the magnetic disc pack, and the sensing surface matching with the direction regulating surface of the magnetic disc pack is formed on this openable lid, so that erroneous insertion of the magnetic disc pack into the magazine can be avoided.

In the magazine of the magnetic disc pack according to the present invention, the disappearing sensing member is provided on the portion of the magazine for housing the magnetic disc pack and this sensing member is pushed up by the direction regulating surface of the magnetic disc pack to retract from the housing portion, so that erroneous insertion of the magnetic disc pack into the magazine can be avoided.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A device for automatically changing a magnetic disc pack, wherein a magazine loaded with a plurality of magnetic disc packs is inserted in said device, and each magnetic disc pack contains a magnetic disc, said device withdrawing a selected magnetic disc pack from said plurality of magnetic disc packs out of said magazine in accordance with a predetermined reproduction order and setting said selected magazine disc pack in a reproducing section within said device for reproduction of an image stored on said disc, said device for automatic change comprising:
    a main body having an axis defining an axial direction;
    a magazine reciprocation means for inserting and withdrawing said magazine through an opening formed in a front surface of said main body to reciprocate said magazine in the axial direction of said main body;
    a random access means cooperating with said magazine reciprocation means for reciprocating said magazine in the main body in a transverse direction perpendicularly intersecting the axial direction and moving the magnetic disc pack selected in accordance with a predetermined reproduction order to a position adjacent a holder within said main body;
    a magnetic disc pack carrying means reciprocatingly movable in the axial direction, for withdrawing from said magazine said selected disc pack to a position opposed to said holder of the random access mechanism and inserting said magnetic disc pack into said magazine after reproduction;
    a shutter opening-closing means for opening and closing a shutter of said magnetic disc pack relative to insertion and withdrawal of said magnetic disc pack; and
    a magnetic disc pack loading means cooperating with said holder for reciprocatingly moving said magnetic disc pack in said holder in the transverse direction perpendicularly intersecting the axial direction, and for guiding said magnetic disc pack to and from a reproduction position where said magnetic disc pack is mounted onto a driving shaft of said reproducing section.

2. A device for automatically changing a magnetic disc pack as set forth in claim 1, wherein each of said magnetic disc packs includes a recess, and said magnetic disc pack carrying means includes a pawl selectively engageable with said recess and a cam for moving the pawl into selective engagement with said recess, said cam being linked to said magnetic disc carrying means by linkage means for moving said pawl to engage said recess for conveying said magnetic disc pack out of and into said magazine, and retracting the pawl from said recess at a predetermined position.

3. A device for automatically changing a magnetic disc pack as set forth in claim 1, wherein said random access means includes a magazine bearer cooperating with magazine reciprocation means and insertable into and withdrawable from said magazine reciprocating means, said magazine bearer having a surface for bearing said magazine, said surface including a projection selectively engaging a complementary cut out formed on a matching surface of said magazine for preventing erroneous mounting of said magazine in said magazine bearer.

4. A device for automatically changing a magnetic disc pack as set forth in claim 1, wherein said magazine includes a lid, and a lid opening-closing member is linked with said magazine reciprocation means to rotate said lid opening-closing member in response to axial reciprocation of said magazine to thereby open and close said magazine lid.

5. A magazine as set forth in claim 1 wherein said shutter opening-closing means is provided on said holder, the shutter of said magnetic disc pack opening when said magnetic disc pack is inserted into said holder by said magnetic disc pack carrying means, and closing when said magnetic disc pack is withdrawn from said holder.

* * * * *